United States Patent [19]

McCready et al.

[11] Patent Number: 4,740,563
[45] Date of Patent: Apr. 26, 1988

[54] CROSSLINKED POLYETHERIMIDE ESTER POLYMERS

[75] Inventors: Russell J. McCready; John A. Tyrell, both of Mt. Vernon, Ind.

[73] Assignee: General Electric Company, Pittsfield, Mass.

[21] Appl. No.: 936,697

[22] Filed: Dec. 2, 1986

[51] Int. Cl.$^4$ .................... C08F 283/04; C08G 69/48; C08L 77/00

[52] U.S. Cl. .................................. 525/421; 525/422; 525/425; 525/426; 528/288; 528/289; 528/291; 528/292

[58] Field of Search ............... 525/421, 422, 425, 426, 525/437; 528/288, 289, 291, 292

[56] References Cited

U.S. PATENT DOCUMENTS

| | | | |
|---|---|---|---|
| 4,141,886 | 2/1979 | Sollner et al. | 525/422 |
| 4,544,734 | 10/1985 | McCready | 528/288 |
| 4,552,950 | 11/1985 | McCready | 528/292 |
| 4,556,688 | 12/1985 | McCready | 525/33 |
| 4,556,705 | 12/1985 | McCready | 528/289 |
| 4,687,819 | 8/1987 | Quinn et al. | 525/425 |

Primary Examiner—Lucille M. Phynes

[57] ABSTRACT

A crosslinked polyetherimide ester polymer comprised of the reaction products of:
  (i) at least one diol;
  (ii) at least one dicarboxylic acid or an ester forming derivative thereof;
  (iii) a set of reactants selected from
     (a) (1) at least one high molecular weight poly(oxy alkylene)diamine, and (2) at least one tricarboxylic acid or its derivative, or
     (b) at least one high molecular weight polyoxylene diimide diacid; and
  (iv) a crosslinking effective amount of at least one crosslinking agent.

31 Claims, No Drawings

CROSSLINKED POLYETHERIMIDE ESTER POLYMERS

BACKGROUND OF THE INVENTION

Thermoplastic polyetherimide ester elastomers comprised of the reaction products of (a) a low molecular weight diol, (b) a dicarboxylic acid, and (c) a high molecular weight polyoxyalkylene diimide diacid are known and are described in U.S. Pat. Nos. 544,734; 4,556,705 and 4,556,688. These thermoplastic poly(etherimide ester) elastomers exhibit excellent stress-strain properties, low tensile set, high melting temperatures and/or excellent strength/toughness characteristics as well as excellent flexibility, which properties render them especially suitable for molding and extrusion applications.

It has now been discovered that these polyetherimide esters can be crosslinked by the use of certain crosslinking agents.

SUMMARY OF THE INVENTION

The instant invention is directed to crosslinked polyetherimide esters which are comprised of the reaction products of:
(i) at least one low molecular weight diol;
(ii) at least one dicarboxylic acid or an ester forming reactive derivative thereof;
(iii) a set of reactants selected from
  (a) (1) at least one high molecular weight poly(oxy alkylene)diamine, and (2) at least one tricarboxylic acid or its derivative, or
  (b) at least one high molecular weight polyoxyalkylene diimide diacid, and
(iv) at least a crosslinking effective amount of at least one crosslinking agent.

DESCRIPTION OF THE INVENTION

In accordance with the instant invention there are provided crosslinked polyetherimide ester polymers. These crosslinked polymers are comprised of the reaction products of:
(i) at least one low molecular weight diol;
(ii) at least one dicarboxylic acid or an ester forming reactive derivative thereof;
(iii) a set of reactants selected from
  (a) (1) at least one high molecular weight poly(oxy alkylene)diamine, and (2) at least one tricarboxylic acid or its derivative, or
  (b) at least one high molecular weight polyoxyalkylene diimide diacid; and
(iv) at least a crosslinking effective amount of at least one crosslinking agent.

Suitable diols (i) for use in preparing the polymers of the present invention include the saturated and unsaturated aliphatic and cycloaliphatic dihydroxy compounds as well as aromatic dihydroxy compounds. These diols are preferably of a low molecular weight, i.e., having a molecular weight of about 250 or less. When used herein the terms "diol" and "low molecular weight diol" include equivalent ester forming derivatives thereof, provided however, that the molecular weight requirement pertains to the diol only and not to its derivative. Exemplary of ester forming derivatives there may be given the acetates of the diols as well as, for example, ethylene oxide or ethylene carbonate for ethylene glycol.

Preferred saturated and unsaturated aliphatic and cycloaliphatic diols are those having from 2 to about 15 carbon atoms. Exemplary of these diols there may be given ethylene glycol, propanediol, butanediol, pentanediol, 2-methyl propanediol, 2,2-dimethyl propanediol, hexanediol, decanediol, 1,2-, 1,3- and 1,4-cyclohexane dimethanol, butenediol, hexenediol, etc. Especially preferred are 1,4-butanediol and mixtures thereof with hexanediol, 1,4-cyclohexane dimethanol, or butenediol, most preferably 1,4-butanediol.

Aromatic diols suitable for use in the practice of the present invention are generally those having from 6 to about 15 carbon atoms. Included among the aromatic dihydroxy compounds are resorcinol, hydroquinone, 1,5-dihydroxy naphthalene, 4,4'-dihydroxy diphenyl, bis(p-hydroxy phenyl)methane and bis(p-hydroxy phenyl)2,2-propane.

Especially preferred diols are the saturated aliphatic diols, mixtures thereof, and mixtures of a saturated diol(s) with an unsaturated diol(s), wherein each diol contains from 2 to about 8 carbons. Where more than one diol is employed it is generally preferred that at least about 60 mole %, based on total diol content, be the same diol.

Dicarboxylic acids (ii) which are suitable for use in the practice of the present invention are aliphatic, cycloaliphatic and/or aromatic dicarboxylic acids. These acids preferably are of a low molecular weight, i.e., having a molecular weight of less than about 300. However, in some cases higher molecular weight dicarboxylic acids may be used. The term "dicarboxylic acids" as used herein includes equivalents of dicarboxylic acids having two functional carboxyl groups which perform substantially like dicarboxylic acids in reaction with glycols and diols in forming polyesters. These equivalents include esters and ester-forming reactive derivatives, such as the acid halides and anhydrides. The molecular weight preference mentioned above pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids may contains any substituent group(s) or combinations which do not substantially interfere with the polymer formation and use of the polymer of this invention.

Aliphatic dicarboxylic acids, as the term is used herein, refer to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals such as —O— or —SO$_2$—.

Representative aliphatic and cycloaliphatic acids which can be used for this invention are sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1, 2-dicarboxylic acid, 2-ethylsuberic acid, tetramethylsuccinic acid, cyclopentanedicarboxylic acid, decahydro-1,5 naphthlene dicarboxylic acid, 4,4'-bicyclohexyl dicarboxylic acid, decahydro-2,6 naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, oxybis(benzoic acid), ethylene-1,2 -bis(p-oxyhenzoic acud), 1,5-naphthalene dicarboxylic acid acid, anthracene dicarboxylic acid, 2,6-naphthalene dicarboxylic acid, 2,7-naphthalene dicarboxylic acid, phenantherene dicarboxylic acid, 4,4'-sulfonyl dibenzoic acid, and halo and $C_1$–$C_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids those with 8–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % of dicarboxylic acid (ii) be the same dicarboxylic acid or ester derivative thereof. As mentioned above, the preferred compositions are those in which dimethylterephthalate is the predominant dicarboxylic acid, most preferably when dimethylterephthalate is the only dicarboxylic acid.

The crosslinked polyetherimide ester polymers of the present invention may be prepared by a one-pot synthesis involving the reaction of the diol (i), the dicarboxylic acid (ii), the high molecular weight poly(oxy alkylene)-diamine (iii)(a)(1), the tricarboxylic acid (iii)(a)(2), and a crosslinking effective amount of crosslinking agent (iv). In such a process the polyoxyalkylene diimide diacid (iii)(b) is formed in-situ by the reaction of the poly(oxy alkylene) diamine with the tricarboxylic acid.

The poly(oxy alkylene)diamines (iii)(a)(1) suitable for use in the present invention may be represented by the general formula

   I.

wherein G is the radical remaining after the removal of the amino groups of a long chain alkylene ether diamine. These polyether primary diamines are available commercially from Texaco Chemical Company under the tradename JEFFAMINE. In general, they are prepared by known processes for the amination of glycols. For example, they may be prepared by aminating the glycol in the presence of ammonia, Raney nickel catalyst and hydrogen as set forth in Belgium patent No. 634,741. Alternately, they may be prepared by treating glycol with ammonia and hydrogen over a Nickel-Copper-Chromium catalyst as taught by U.S. Pat. No. 3,654,370. Other methods for the production thereof include those taught by U.S. Pat. Nos. 3,155,728 and 3,236,895 and French Patent Nos. 1,551,605 and 1,466,708, all of the foregoing patents are incorporated herein by reference.

The long chain ether diamines suitable for use herein are the polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide) terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsequently aminating are useful. Especially preferred poly(alkylene ether) diamines are poly(propylene ether)diamine, poly (tetramethylene ether)diamine, and the poly(ethylene ether)glycols which are end-capped with poly (propylene ether) and/or propylene oxide and subsequently aminated.

In general, the polyoxyalkylene diamines useful in the practice of the present invention have an average molecular weight of from about 600 to about 12,000, preferably from about 900 to about 4,000.

The tricarboxylic acid (iii)(a)(2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3',4-diphenyl tricarboxylic anhydride, 3,3',5-benzophenone tricarboxylic anhydride, 1,3,4-cyclopentane tricarboxylic anhydride, 2,2', 3-diphenyl tricarboxylic anhydride, diphenyl sulfone-3,3',4-tricarboxylic anhydride, ethylene tricarboxylic anhydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula

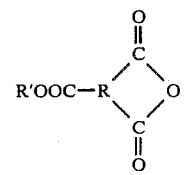   II.

wherein:

R is a trivalent organic radical, preferably a $C_2$–$C_{20}$ aliphatic or cycloaliphatic, or $C_6$–$C_{20}$ aromatic trivalent radical; and $R^1$ is preferably hydrogen or a monovalent organic radical preferably selected from $C_1$–$C_6$ aliphatic and/or cycloaliphatic radicals and $C_6$–$C_{12}$ aromatic radicals, e.g., benzyl, most preferably hydrogen.

In the preparation of the instant polyetherimide ester polymers sufficient amounts of diol versus dicarboxylic acid, and tricarboxylic acid versus diamine must be present, as recognized in the art, to allow for substantially complete polymerization The type of one-pot reaction involving the reaction of (i) a diol, (ii) a dicarboxylic acid, (iii)(a)(1) a poly(oxy alkylene)diamine and (2) a tricarboxylic acid, and (iv) a crosslinking agent is described, in general terms absent (iv), in U.S. Pat. No. 4,556,688, incorporated herein by reference. In this type of one-pot reaction the amount of diol (i) employed will be, in general, a molar excess, preferably about 1.5 molar equivalents, based on the combined molar equivalents of dicarboxylic acid (ii) and of the total moles of the tricarboxylic acid (iii)(a)(2). The amount of the tricarboxylic acid employed will preferably be about two molar equivalents based on the number of moles of the poly(oxy alkylene) diamine. Obviously, less than two molar equivalents would result in incomplete imidization of the diamine resulting in potentially poorer properties. Generally, mole ratios of 2 moles of tricarboxylic acid to 0.85 to 1.15 mole of poly(oxy alkylene)diamine will yield useful polymers.

The amounts by which the diamine (iii)(a)(1) and the dicarboxylic acid (ii) are used in the instant invention are such that the weight ratio of the theoretical amount of the polyoxyalkylene diimide diacid, formable from the polyoxy alkylene) diamine and the tricarboxylic acid, to the dicarboxylic acid is from about 0.25 to about 2.0:1, preferably from about 0.4 to about 1.4:1.

While the amount of diol will directly affect the degree of polymerization achieved in the polymerization process, the weight ratio of the theoretical yield of polyoxyalkylene diimide diacid to dicarboxylic acid will have the greater impact on the properties of the final polymer. The actual weight ratio employed will be dependent upon the specific polyoxyalkylene diimide diacid and more importantly, the desired physical and chemical properties of the resultant polyetherimide ester. In general, the lower the weight ratio of the polyoxyalkylene diimide diacid to dicarboxylic acid the better the strength, crystallization and heat distortion properties of the polymer. Alternately, the higher the ratio, the better the flexibility, tensile set and low temperature impact characteristics.

The crosslinking agent (iv) is a polyfunctional organic compound, preferably an aromatic polyfunctional compound, containing at least three functional groups which may be hydroxy, carboxyl, carboxylic anhydride, haloformyl, or mixtures thereof. Some illustrative non-limiting examples of these polyfunctional organic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenone tetracarboxylic acid, benzophenonetetracarboxylic anhydride, tetracarboxybutane anhydride, 4,4-bis(4-hydroxyphenyl)pentanoic acid, 4,4-dimethyl-2,4,6-tri-(4-hydroxyphenyl)heptane, 1,3,5-tri-(4-hydroxyphenyl)benzene, glycerol, and the like. The polyfunctional compounds are well known in the art and are generally commercially available or may be readily prepared by known and conventional processes. Some polyfunctional aromatic compounds, including those exemplified above, are disclosed, inter alia, in U.S. Pat. Nos. 3,525,712; 3,451,049; 3,544,514; 3,635,895; 3,816,373; 4,001,184; 4,204,047 and 4,194,953, all of which are incorporated herein by reference.

The amount of the crosslinking agent (iv) present is an amount which is effective to form crosslinked polymers, i.e. a crosslinking effective amount. This amount is one which is effective to form crosslinks in the polymer. As such, it is greater than amounts which are effective to form branching in the polymer chain. Amounts effective to form branching are, as disclosed in U.S. Pat. No. 4,556,688, below about 0.15 mole per mole of diimide diacid. Generally, this amount is at least about 0.2 weight percent, preferably at least about 0.5 weight percent, and more preferably at least about 1.0 weight percent. Weight percent of crosslinking agent is based on on the total amounts of reactants (i)–(iv) present in the reaction mixture. Generally, the amount of crosslinking agent present in the reaction mixture should not exceed about 15 weight percent, preferably about 10 weight percent. In general, if amounts of crosslinking agent in excess of about 15 weight percent are employed the resultant polymer will be so highly crosslinked as to be rather intractible, i.e., quite difficult to process,using conventional processing techniques.

The degree of crosslinking present in the polymer can be controlled by varying the amount of crosslinking agent employed. In general, the smaller the amount of crosslinking agent that is employed the lower the degree of crosslinking present in the polymer. Conversely, the larger the amount of crosslinking agent present in the reaction mixture the more highly crosslinked the polymer.

It is to be understood that mixtures of two or more different crosslinking agents, as well as individual crosslinking agents may be employed in the practice of the present invention.

The instant crosslinked polyetherimide esters may also be prepared by a two-pot synthesis involving the reaction of (i) a low molecular weight diol, (ii) a dicarboxylic acid or its ester forming reactive derivative, (iii)(b) a high molecular weight polyoxyalkylene diimide diacid, and (iv) a crosslinking effective amount of at least one crosslinking agent. Such a reaction is described in general terms, absent (iv),in U.S. Pat. No. 4,556,705, to McCready, incorporated herein by reference. Basically, in this process the poly(oxy alkylene) diamine is reacted with the tricarboxylic acid to form a polyoxyalkylene diimide diacid, and the preformed polyoxyalkylene diimide diacid is then reacted with the diol, dicarboxylic acid, and crosslinking agent to form the polyetherimide ester polymers.

The polyoxyalkylene diimide diacid (iii)(b) may be represented by the general formula

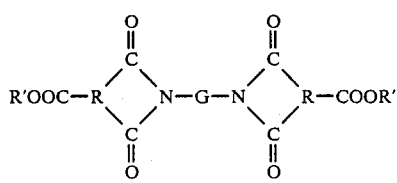

III.

wherein G, R and R' are as defined hereinafore.

The polyoxyalkylene diimide diacids of Formula III suitable for use herein are high molecular weight diimide diacids having an average molecular weight greater than about 700, preferably greater than about 900. They may be prepared by the imidization reaction of one or more tricarboxylic acids (iii)(a)(2) containing two vicinal carboxyl groups or an anhydride group and an additional carboxyl group which must be esterifiable with the high molecular weight poly (oxy alkylene)diamine (iii)(a)(1). These polyoxyalkylene diimide diacids and processes for their preparation are disclosed in U.S. Pat. No. 4,556,705, incorporated herein by reference. Briefly, these polyoxyalkylene diimide diacids may be prepared by known imidization processes including melt synthesis or by synthesizing in a solvent system. Such reactions will generally occur at temperatures from about 100° C. to about 300° C., preferably at temperatures from about 150° C. to about 250° C., while drawing off water or in a solvent system at the reflux temperature of the solvent or azeotropic (solvent) mixture.

In this two-pot process, as in the one-pot process described hereinafore, it is generally preferred that the diol be present in at least a molar equivalent amount, preferably a molar excess, most preferably at least 150 mole % based on the moles of dicarboxylic acid and polyoxyalkylene diimide diacid combined. Such molar excess of diol will generally allow for optimal yields, based on the amount of acids, while accounting for the loss of diol during esterification.

In this two-pot process the amounts of the polyoxyalkylene diimide diacid and dicarboxylic acid used are such that the weight ratio of the diimide diacid to dicarboxylic acid is from about 0.25 to about 2.0:1, preferably from about 0.4 to about 1.4:1. The amount of the crosslinking agent employed in this two-pot process is likewise a crosslinking effective amount, i.e., at least about 0.2 weight %, preferably at least about 0.5 weight %, and more preferably at least about 1.0 weight % based on reactants (i), (ii), (iii)(b) and (iv) present. As in the one-pot process the maximum amount of crosslinking agent should generally not exceed about 15 weight percent, preferably about 10 weight percent.

In this two-pot process the crosslinking agent (iv) may be present during the formation of the polyoxyalkylene diimide diacid as well as during the reaction of the diimide diacid with the dicarboxylic acid and the diol, or only during the latter reaction.

It is also possible, as described in U.S. Pat. No. 4,556,688, to prepolymerize the aromatic dicarboxylic acid and the diol to form the prepolyester, and then react this prepolyester with either the diimide diacid or with the tricarboxylic acid and the poly(oxy alkylene)-diamine. Forming the prepolyester can be achieved by conventional esterification techniques such as those described in U.S. Pat. Nos. 2,465,319 and 2,910,466, incorporated herein by reference. In this process the crosslinking agent may be present during the prepolymerization process of the dicarboxylic acid and the diol, as well as during the reaction of the prepolyester with the diimide diacid or tricarboxylic acid and diamine, or it may be present only during the reaction of the prepolyester with the diimide diacid or with the tricarboxylic acid and the diamine.

In its preferred embodiment the composition of the instant invention will comprise the reaction products of dimethyl terephthalate, optionally with up to 40 mole percent of another dicarboxylic acid; butane diol, optionally with another diol such as butene diol, hexanediol, or cyclohexane dimethanol; and either a poly(oxy alkylene)diamine having having an average molecular weight of from about 900 to about 4,000 and trimellitic anhydride, or a polyoxyalkylene diimide diacid derived from the aforedescribed poly(oxy alkylene)diamine and trimellitic anhydride; and a crosslinking agent.

Additionally, while not required, it is customary and preferred to utilize a catalyst or catalyst system in the process for the production of the crosslinked polyetherimide esters of the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, the phosphorus compounds such as phosphoric acid, phosphenic acid, phosphonic acid and the alkyl or aryl esters or salts thereof, in order to increase the thermal stability of the resultant polymer.

Exemplary of suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include zinc acetate, calcium acetate and combinations thereof with antimony tri-oxide and the like. These catalysts as well as additional useful catalysts are described in U.S. Pat. Nos. 2,465,319; 2,534,028; 2,850,483; 2,892,815; 2,937,160; 2,998,412; 3,047,539; 3,110,693 and 3,385,830, among others, incorporated herein by reference.

Where the reactants and reactions allow, it is preferred to use the titanium catalysts including the inorganic and organic titanium containing catalysts, such as those described, for example, in U.S. Pat. Nos. 2,720,502; 2,727,881; 2,729,619; 2,822,348; 2,906,737; 3,047,515; 3,056,817; 3,056,818 and 3,075,952, incorporated herein by reference. Especially preferred are the organic titanates such as tetra-butyl titanate, tetra-isopropyl titanate and tetra-octyl tianate and the complex titanates derived from alkali or alkaline earth metal alkoxides and titanate esters, most preferably the organic titanates. These too may be used alone or in combination with other catalysts such as, for example, zinc acetate, calcium acetate, manganese acetate or antimony trioxide, and/or with a catalyst quencher as described above. The catalyst is used in catalytic amounts, e.g., from about 0.005 to about 2 percent by weight based on total reactants.

Both batch and continuous methods can be used for any stage of the ether imide ester polymer preparation. Polycondensation of the polyester prepolymer with the polyoxyalkylene diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer.

Although the copolyetherimide esters of this invention possess good resistance toward heat aging and photodegradation, it is advisable to stabilize these compounds by the addition of an antioxidant.

Many of the oxidative and/or thermal stabilizers known in the art for copolyesters may be used in the practice of the present invention. These may be incorporated into the composition either during polymerization or while in a hot melt stage following polymerization. Satisfactory stabilizers include the phenols and their derivatives, amines and their derivatives, compounds containing both hydroxyl and amine groups, hydroxyazines, oximes, polymeric phenolic esters and salts of multivalent metals in which the metal is in its lower valence state. Some specific examples of these stabilizers are described in U.S. Pat. No. 4,556,688, incorporated herein by reference.

The instant polymers may be stabilied against ultraviolet radiation by the addition thereto of the well known ultraviolet radiation stabilizers such as the benzophenones, benzotriazoles, cyanoacrylates, and the like.

Further, the properties of these polymers can be modified by incorporation of various conventional and well known fillers such as carbon black, silica gel, alumina, clays, and chopped fiberglass or glass particles. These may be incorporated in amounts of up to about 50 weight percent, preferably up to about 30 weight percent.

In addition to the aforedescribed methods of preparing the crosslinked polymers of the present invention they may also be prepared by first preforming the polyetherimide ester polymers by the reaction of reactants (i)–(iii), i.e., in the absence of the crosslinking agent (iv), forming a blend of the non-crosslinked polymer and the crosslinking agent, and then heating this blend to a temperature sufficient for the crosslinking agent to react with the non-crosslinked polymer and form a crosslinked polymer.

In this method the amount of crosslinking agent that is admixed or blended with the non-crosslinked polyetherimide ester polymer is a crosslinking effective amount. Generally this amount is at least about 0.2 weight percent, preferably at least about 0.5 weight percent, and more preferably at least about 1.0 weight percent. Similarly to the aforedescribed processes for producing a crosslinked polymer the maximum amount of crosslinking agent that is admixed with the non-crosslinked polymer should generally not exceed about 15 weight %, preferably about 10 weight %. Weight percent of crosslinking agent is based on the total amounts of crosslinking agent and non-crosslinked polyetherimide ester polymer present in the blends.

The temperatures at which the crosslinking agent reacts with the non-crosslinked polymer to form a crosslinked polymer are generally the melting temperatures of the non-crosslinked polyetherimide ester polymer. These temperatures are generally in the range of from about 120° to about 300° C., preferably from about 200° to about 250° C.

Examples of this method of forming the crosslinked polyetherimide ester polymers of the present invention include forming a blend or mixture of the non-crosslinked polyetherimide ester polymer and the crosslinking agent, and thereafter extruding or injection molding this mixture or blend.

DESCRIPTION OF THE PREFERRED EMBODIMENT

The following examples are presented to more fully and clearly illustrate the present invention. They are presented as illustrative of the present invention and are not to be construed as limiting the invention thereto. In the examples all parts and percentages are parts and percentages by weight unless otherwise indicated.

The following example illustrates a crosslinked polyetherimide ester polymer of the instant invention.

EXAMPLE 1

This example illustrates a crosslinked polyetherimide ester resin prepared from a reaction mixture containing 6.4 weight percent of crosslinking agent based on the total reactant charge weight.

Into a reactor vessel are placed 158 parts by weight of butanediol, 300 parts by weight of a polyoxyalkylene diimide diacid (prepared by the imidization of trimellitic anhydride with JEFFAMINE D2000, a propylene ether diamine having an average molecular weight of 2,000, marketed by Texaco Chemical Co.), 200 parts by weight of dimethyl terephthalate, 45 parts by weight of trimethyltrimellitate (crosslinking agent), a phenolic antioxidant, and a titanium catalyst. The mixture is heated to about 180° C. whereupon methanol is generated. After the theoretical amount of methanol is removed the pot temperature is increased to about 240° C. and a vacuum applied to produce the crosslinked polyetherimide ester polymer. The product exhibited good melt strength and melt elasticity. The polymer had a Tm (melt temperature) of 159° C.

The crosslinked polymers of the instant invention exhibit better or higher melt strength than comparable non-crosslinked polyetherimide ester polymers.

At relatively low degrees of crosslinking the polymers of the instant invention are useful in the production of extruded and injection molded articles. At higher degrees of crosslinking the instant polymers are suited for blow molding operations.

In a preferred embodiment of the instant invention the crosslinked polymers are free of dimer acids, either as one of the reactants, or as an additive which is added to the finshed polymer. That is to say, the crosslinked polyetherimide ester polymers of this embodiment are dimer acid free.

Obviously, other modifications and variations of the present invention are possible in light of the above teachings. It is, therefore, to be understood that changes may be made in the particular embodiments of the instant invention described above which are within the full intended scope of this invention as defined by the appended claims.

What is claimed is:

1. A crosslinked polyetherimide ester polymer comprised of the reaction products of:
 (i) at least one diol;
 (ii) at least one dicarboxylic acid or an ester forming derivative thereof;
 (iii) a set of reactants selected from
   (a) (1) at least one high molecular weight poly(oxy alkylene)diamine, and (2) at least one tricarboxylic acid or derivative thereof, or
   (b) at least one high molecular weight polyoxyalkylene diimide diacid; and
 (iv) a crosslinking effective amount of at least one crosslinking agent.

2. The polymer of claim 1 wherein said crosslinking agent is selected from polyfunctional organic compounds.

3. The polymer of claim 2 wherein said polfunctional organic compounds contain at least three functional groups selected from hydroxyl, carboxyl, carboxylic anhydride, halformyl, or mixtures thereof.

4. The polymer of claim 3 wherein said polyfunctional organic compound is a polyfunctional aromatic compound.

5. The polymer of claim 3 wherein said crosslinking effective amount of (iv) is at least about 0.2 weight percent, based on the total amounts of (i)–(iv) present.

6. The polymer of claim 5 wherein said crosslinking effective amount of (iv) is at least about 0.5 weight percent.

7. The polymer of claim 6 wherein said crosslinking effective amount of (iv) is at least about 1.0 weight percent.

8. The polymer of claim 7 wherein said crosslinking agent is trialkyl trimellitate.

9. The polymer of claim 1 wherein said diol has a molecular weight of about 250 or less.

10. The polymer of claim 9 wherein said dicarboxylic acid is an aromatic dicarboxylic acid or its ester forming reactive derivative.

11. The polymer of claim 10 wherein said aromatic dicarboxylic acid is dimethyl terephthalate.

12. The polymer of claim 1 wherein (iii) is (a).

13. The polymer of claim 12 wherein said high molecular weight poly(oxy alkylene)diamine has an average molecular weight of from about 600 to about 12,000.

14. The polymer of claim 13 wherein said high molecular weight poly(oxy alkylene)diamine has an average molecular weight of from about 900 to about 4,000.

15. The polymer of claim 14 wherein said high molecular weight poly(oxy alkylene)diamine is selected from poly(ethylene ether)diamine, poly(propylene ether)diamine, poly(tetramethylene ether)diamine, copoly(propylene ether-ethylene ether)diamine, or mixtures thereof.

16. The polymer of claim 12 wherein said tricarboxylic acid or its derivative is represented by the formula

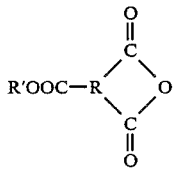

wherein R is a $C_2$ to $C_{20}$ aliphatic or cycloaliphatic trivalent organic radical or a $C_6$–$C_{20}$ aromatic trialent organic radical; and R' is hydrogen, a $C_1$–$C_6$ aliphatic or cycloaliphatic monovalent organic radical, or a $C_6$–$C_{12}$ aromatic monovalent organic radical.

17. The polymer of claim 16 wherein said tricarboxylic acid is trimellitic anhydride.

18. The polymer of claim 12 wherein the weight ratio of the theoretical amount of polyoxyalkylene diimide diacid formable from the tricarboxylic acid (iii)(a)(2) and the high molecular weight poly(oxy alkylene)diamine (iii)(a)(1) to the dicarboxylic acid (ii) is from about 0.25 to about 2.0:1.

19. The polymer of claim 18 wherein said diol (i) is butanediol, butenediol, hexanediol, cyclohexane dimethanol or mixtures thereof.

20. The polymer of claim 1 wherein (iii) is (b).

21. The polymer of claim 20 wherein said high molecular weight polyoxyalkylene diimide diacid is represented by the formula

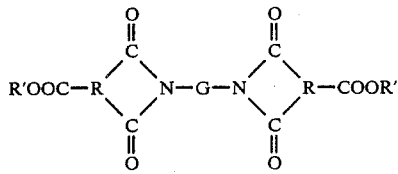

wherein:
G is the radical remaining after the removal of the amino groups of a high molecular weight poly(oxy alkylene)diamine having an average molecular weight of from about 600 to about 12,000;
R is a $C_2$–$C_{20}$ aliphatic or cycloaliphatic organic trivalent radical or a $C_6$ to $C_{20}$ aromatic organic trivalent radical; and
R' is hydrogen a $C_1$–$C_6$ aliphatic or cycloaliphtic organic monovalent radical or a $C_6$–$C_{12}$ aromatic organic monovalent radical.

22. The polymer of claim 12 wherein said poly(oxy alkylene)diamine has an average molecular weight of from about 900 to about 4,000.

23. The polymer of claim 22 wherein R' is hydrogen.

24. The polymer of claim 23 wherein R is a $C_6$ aromatic trivalent radical.

25. The polymer of claim 21 wherein said diol (i) is selected from butanediol, butenediol, hexanediol, 1,4-cyclohexane dimethanol or mixtures thereof.

26. The polymer of claim 25 wherein said dicarboxylic acid (ii) is an aromatic dicarboxylic acid or its ester forming derivative.

27. The polymer of claim 26 wherein said aromatic dicarboxylic acid is dimethyl terephthalate.

28. The polymer of claim 21 wherein the weight ratio of said polyoxyalkylene diimid diacid to said dicarboxylic acid (ii) is from about 0.25 to about 2.0:1.

29. The polymer of claim 1 which is comprised of the reaction products of (i)–(iii) reacted with (iv).

30. The polymer of claim 29 wherein (iii) is (a).

31. The polymer of claim 29 wherein (iii) is (b).

* * * * *